United States Patent Office 3,061,620
Patented Oct. 30, 1962

3,061,620
POLYCARBOXY ACID ESTERS OF POLY-
OXYETHYLATED CASTOR OIL
Willard H. Kirkpatrick, Sugar Land, and Virgil L. Seale and Alice Walker Church, Houston, Tex., assignors to Nalco Chemical Company, a corporation of Delaware
No Drawing. Original application Mar. 7, 1955, Ser. No. 492,798, now Patent No. 2,971,923, dated Feb. 14, 1961. Divided and this application Aug. 5, 1960, Ser. No. 47,583
8 Claims. (Cl. 260—404.8)

This invention relates to new and useful chemical compositions having surface-active properties and capable of lowering the interfacial tension between water and oil, especially in water-in-oil emulsions. These compositions are useful in the treatment of emulsions of mineral oil and water, such as petroleum emulsions commonly encountered in the production, handling and refining of crude mineral oil, for the purpose of breaking the emulsion to separate the oil from the water. They may also be used in the treatment of other water-in-oil type of emulsions wherein the emulsions are produced artificially or naturally and the resolution of the emulsions presents a problem of recovery or disposal. A particularly important aspect of the invention is concerned with the employment of the compositions of the invention in desalting.

This application is a divisional application of our copending application Ser. No. 492,798, filed March 7, 1955, which matured into U.S. Patent 2,971,923 on February 14, 1961.

Naturally-occurring petroleum emulsions are usually of the water-in-oil type wherein the oil acts as a continuous phase in which is dispersed finely divided particles of naturally-occurring waters or brines. These emulsions are often extremely stable and will not resolve on long standing. It is to be understood that water-in-oil emulsions may occur artificially, resulting from any one or more of numerous operations encountered in various industries. The emulsions obtained from producing wells and from the bottom of crude oil storage tanks are commonly referred to as "cut oil," "emulsified oil," "bottom settlings," and "B.S."

One technique for using the compounds of this invention involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another application of these compounds involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste— resulting in 90% to 98% removal of salt content. This operation is carried out continuously as contrasted with batch treating.

In desalting operations where petroleum emulsions are created artificially and then broken, the conditions employed are usually quite different from those used in breaking water-in-oil petroleum emulsions at the well. The temperatures may range from 160° F. to 350° F. and are preferably around 190° F. to 210° F. The pressures are those which are developed by heating under autogenous pressures and may be, for example, 215 to 250 pounds per square inch gauge. The time of heating is subject to variations but is usually around 15 to 30 minutes. Since a refinery unit may handle up to 50,000 barrels of oil per day and the amount of salt present may be, for example, 15 pounds to 250 pounds of salt per thousand barrels of oil, it will be appreciated that the separation of this salt is very important, especially since it is usually desired to reduce the salt content of the oil by at least 90%.

One of the objects of the present invention is to provide a new and useful composition of matter which is water-wettable, interfacial and surface-active in order to enable its use as a demulsifier or for such uses where surface-active characteristics are necessary or desirable.

A further object of the invention is to provide new and improved compounds useful for resolving water-in-petroleum oil emulsions into their component parts of oil and water or brine.

An additional object of the invention is to provide new and improved compounds useful in processes for desalting petroleum oils. Other objects will appear hereinafter.

In accordance with this invention, new and useful chemical compositions are provided which may be described as oxyethylated castor oil esterified with a polycarboxy acid.

The oxyethylation is effected by reacting ethylene oxide with the castor oil. The temperature employed is subject to variation but ordinarily a temperature of about 160° C. is employed initially and after the reaction starts the temperature may vary within the range of about 130° C. to 200° C. The pressures employed are also subject to variation but are usually within the range of 30 to 100 pounds per square inch gauge.

The relative proportion of oxyethylene groups added to the castor oil is important for the purpose of the invention. The minimum proportion is preferably at least 5 mols of ethylene oxide per hydroxyl group and the maximum is preferably not more than 15 mols of ethylene oxide per hydroxyl group. Since castor oil is an ester of glycerine containing essentially three ricinoleyl radicals, each of which contains one hydroxyl group, the minimum number of mols of ethylene oxide is 15 mols per mol of castor oil and the maximum number is 45 mols of ethylene oxide per mol of castor oil.

The esterification of the oxyethylated castor oil is preferably carried out at a temperature of 200° C. to 300° C. for a period of time sufficiently long to eliminate the theoretical quantity of water produced by the esterification reaction, plus any free water or water of hydration in the reacting chemicals. It is preferable for the purpose of the invention to employ a sufficient amount of the polycarboxy acid so that at least one of the hydroxyl groups of the oxyethylated castor oil is esterified with a carboxyl group of the polycarboxy acid. On the basis of the castor oil initially used this represents a minimum of at least one mol of the polycarboxy acid per mol of castor oil. The maximum preferably does not exceed 3 mols of the polycarboxy acid per mol of castor oil.

The best modes contemplated for the practice of the invention are illustrated by the following examples in which the quantities are stated in parts by weight unless otherwise indicated.

EXAMPLE I

In a pressure autoclave there is intimately mixed 900 parts of castor oil and two parts of sodium hydroxide. 674 parts of ethylene oxide are charged into a transfer bomb. To the well agitated mixture of castor oil and sodium hydroxide, the ethylene oxide is introduced gradually with a resulting rise in temperature. The reaction temperature was allowed to reach 150° C. and was held between that temperature and 170° C. for six hours at a pressure of 50 to 70 pounds per square inch. The reaction was substantially complete at that time, yielding an oxyethylated castor oil having approximately 5 mols of ethylene oxide per hydroxyl group.

In a three-necked flask, equipped with stirrer and a means of removing aqueous distillate, there was added 300 parts of the oxyalkylated castor oil as prepared above, 45 parts of diglycolic acid and 50 parts of a suitable azeotropic solvent such as $SO_2$ extract. The mixture was heated to a temperature of 270° C., during which time 9 parts of an aqueous distillate were removed. To 100 parts of this diglycolic ester there was added 40 parts of $SO_2$ extract and the mixture agitated to yield a uniform finished product.

EXAMPLE II

One mol of castor oil was reacted with 30 mols of ethylene oxide, using sodium hydroxide as a catalyst in a manner similar to that described in Example I. The time of reaction was approximately six hours at a temperature of 150–170° C., at 50 to 70 pounds per square inch pressure. The oxyethylated castor oil so prepared contained about 10 mols of ethylene oxide per hydroxyl group.

In a suitable reaction vessel provided with means of agitation, heating and removal of an aqueous distillate, 400 parts of the above oxyalkylated castor oil were esterified with 45 parts of diglycolic acid in the presence of 50 parts of a suitable hydrocarbon material. The initial distillate formed at about 185° C. and the heating was continued until a final temperature of 270° C. was reached, at which point 9 parts of aqueous distillate had been secured. The reaction mass was cooled to 80° C., and 35 parts of isopropanol and 230 parts of $SO_2$ extract were then added with agitation to yield the finished product.

EXAMPLE III

In a suitable reaction vessel 300 parts of the oxyalkylated castor oil as prepared in accordance with instructions of Example I were reacted with 48 parts of phthalic anhydride in the presence of 50 parts of $SO_2$ extract. The reaction was carried out at temperatures of approximately 200–250° C. for four hours. During this period 2.7 parts of an aqueous distillate were removed. A blend of 100 parts of this esterified product with 60 parts of $SO_2$ extract was made to yield the finished product.

EXAMPLE IV

In a suitable reaction vessel 230 parts of an oxyethylated castor oil, having 10 mols of ethylene oxide per hydroxyl group, as prepared in accordance with Example II, were reacted with 14 parts of diglycolic acid and 50 parts of a dibasic fatty acid such as Emery's dimer acid or Rohm and Haas' VR–1 acid. The mixture was heated until a total of 5.4 parts of an aqueous distillate were secured, and the maximum temperature was 244° C. After cooling the product to 140° C., 250 parts of $SO_2$ extract were added with agitation to yield the finished product.

EXAMPLE V

Following the procedure outlined in Example I, 45 mols of ethylene oxide were added to one mol of castor oil, to give a product having approximately 15 mols of ethylene oxide per hydroxyl group. To 250 parts of this oxyethylated castor oil contained in a suitable reaction vessel, there was added 14 parts of diglycolic acid and 100 parts of $SO_2$ extract. The reaction mass was heated in order to remove 1.9 parts of an aqueous distillate at a maximum temperature of approximately 250° C.

After cooling this intermediate ester to 140° C., 60 parts of Hardesty 401 fatty acid was added and heating was resumed in order to remove approximately 3 parts of an aqueous distillate at a maximum temperature of 249° C. The mass was cooled again to 140° C. and 40 parts of a suitable hydrocarbon fraction were added with agitation to yield the finished product.

EXAMPLE VI

In a commercial processing kettle there was charged 4500 parts of an oxyethylated castor oil prepared in accordance with the procedure of Example II, 450 parts diglycolic acid, 980 parts of Hardesty 401 fatty acid and 950 parts of a suitable hydrocarbon extract such as $SO_2$ extract. The mixture was heated slowly with agitation to 250° C. to remove approximately 135 parts of an aqueous distillate. It was necessary that the period of heating continue at least 2½ hours after the initial appearance of the aqueous distillate in order to make certain that esterification proceeded to substantial completion. The batch was then cooled to 140° C. and 6150 parts of a suitable hydrocarbon fraction was added and the reaction mixture stirred for 30 minutes to assure a uniform product. Filter aid was then added and the product was filtered at a temperature of approximately 90° C. to yield the finished product.

The following tests illustrate the use of the compositions of the invention.

Field Bottle Demulsification Test

| | |
|---|---|
| Country | Venezuela. |
| Field of | San Tome. |
| Oil company | Mene Grande Oil Co. |
| Lease | Guara No. 1 |
| Percent emulsion in the fluid from the well | 25%. |
| Temperature of test | 140° F. |
| Treating ratio | 1/14,000. |

One hundred (100) cc. samples of the emulsions were placed in conventional field test bottles. Various treating chemicals were added to the bottles at a ratio of 1 part chemical to 14,000 parts emulsion fluid. After the test chemical was added, the samples which were placed in the test bottles were shaken 200 times at atmospheric temperature and subsequently agitated an additional 100 times at a treating temperature of 140° F. After shaking in each instance the water drop was determined and recorded, that is to say, the amount of water which separated from the emulsion. After agitation at elevated temperature, the samples were maintained at 140° F. for a total of 30 minutes to permit settling and stratification of the water.

The emulsion sample was secured just after the oil came from the well and every effort was made to maintain conditions comparable to those present in a full scale plant treatment.

The test showed that the compositions as prepared in accordance with our examples released 24 parts of water at the end of the 30 minute testing period and contained only 1% of emulsion. The chemical actually in use in the field released no water at the end of the testing period and still retained 24% emulsion.

Laboratory Bottle Desalting Test No. 1

A sample of crude oil from an East Chicago, Indiana, refinery was emulsified in a mechanical blender with 6% water. Solutions of desalting chemicals were then pipetted into the regular testing bottles. After heating to 180° F. and being subjected to high voltage in a laboratory electrical dehydrator, the bottles were allowed to remain in a quiescent state for about five minutes and then thief grindouts were made.

The oil treated by the chemical produced in accordance with Example I had the lowest BS&W content, the cleanest water-oil interface, and the fastest water drop of those tested, which included the chemical being used commercially in the refinery.

The test illustrates the superiority of our invention over presently available desalting chemicals.

Plant Desalting Test No. 1

At a West Texas refinery using a combination electrical and chemical desalter and processing a number of different types of crude oils, a plant test was run using a desalting chemical typical of the examples listed above. The chemical being tested was added at 9:00 a.m. one morning and injection was continued until the afternoon of the third day. During this time the ratio of chemical-to-oil was maintained at 0.2 to 0.3 gallon per thousand barrels. The comparable figure for the chemical being used commercially at this refinery prior to this test was 0.7 gallon per thousand barrels. Hence, the practice of our invention in this particular case reduced the chemical cost of desalting more than 50%. The salt removal remained above 95%. The effluent water remained perfectly clear and no trouble of any sort was experienced during the test.

Plant Desalting Test No. 2

At a Mississippi refinery using an electrical desalter aided by chemical addition, a test was run using a desalting chemical of Example VI above. The refinery was processing mixed Mississippi crudes of an average A.P.I. gravity of 20, using approximately 12% wash water.

The competitive chemical was taken out and the chemical of Example VI was added at 5:45 a.m. The test was observed without interruption for three days. During that time the BS&W content of the desalted crude remained below 0.7% and the salt removal remained above 95%. The voltage readings continued in line with data previously obtained and the effluent water continued to be clear.

The test indicated that 12% more oil could be desalted with the chemical of this invention than with the competitive chemical used prior to the test.

The expression "polycarboxy organic acid" is used herein to mean organic acids containing at least two carboxyl groups and it is intended to include the anhydrides of these acids which are functional equivalents. The examples describe compositions made from diglycolic acid, phthalic anhydride, VR-1 acid, Emery dimer acid and Hardesty 401 acid. Other polycarboxy acids which can be employed or used in admixture with any of the aforementioned acids or anhydrides, are terephthalic acid, citric acid, succinic acid, malic acid, adipic acid, sebacic acid, and their homologues. Compositions which are especially useful in desalting have been obtained by the esterification of an oxyethylated castor oil oxyethylated with 15 to 45 mols of ethylene oxide per mol of castor oil and esterified with diglycolic acid.

Emery dimer acid is essentially dilinoleic acid and is a polymer made by polymerizing an unsaturated fatty acid containing at least two nonconjugated double bonds. Such acids may also be described as polymer drying oil acids. The term "drying oil acid" is used herein to mean an unsaturated fatty acid containing at least two double bonds and at least six carbon atoms. The polymer acids employed for the purpose of the invention preferably consist predominantly of dimer acids but may contain trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid, humoceric acid and eicosanic acid. It will be understood that these polymers may include cogeneric mixtures of polycarboxy acids.

A number of these polymer acids are available as by-product materials. Thus, one source of polymeric acids suitable for the purpose of the invention is the still residue of the dry distillation of castor oil in the presence of sodium hydroxide. VR-1 acid is an acid of this type. Hardesty D-75, another acid which can be used in the practice of the invention, consists of about 100% dimer acids. Hardesty 401 contains about 30% monomeric acid and the remainder essentially dimer acids.

VR-1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR-1 acid gave the following analysis:

| | |
|---|---|
| Acid number | 150 |
| Iodine number | 36 |
| Saponification number | 172 |
| Unsaponifiable matter | 3.7%, 3.5% |
| Moisture content | 0.86% |

Any of the polymeric acids disclosed in Landis, U.S. 2,632,695, can be employed as the polycarboxy acid in the preparation of compositions contemplated by the present invention.

The above examples are only a few of the many products which may be prepared according to the principles disclosed in the foregoing discussion. Various examples of the many products which answer the description herein made are contemplated; some may be oil-soluble and others water-soluble, and in many instances they may possess dual solubility to an appreciable extent. The suitability of any of the products for the breaking and resolving of any given emulsion can readily be determined by conventional procedures. The products may be used as such for resolving emulsions of the water-in-oil type or they may be admixed with other demulsifying reagents in varying ratios as required by the problem at hand.

The invention is hereby claimed as follows:

1. An organic polycarboxy acid ester of oxyethylated castor oil oxyethylated with 15 mols to 45 mols of ethylene oxide per mol of castor oil wherein the ester is composed of at least one mole of the acid per mole of the castor oil.

2. An organic dicarboxy acid ester of oxyethylated castor oil oxyethylated with 15 mols to 45 mols of ethylene oxide per mol of castor oil wherein the ester is composed of at least one mole of the acid per mole of the castor oil.

3. A diglycolic acid ester of oxyethylated castor oil oxyethylated with 15 mols to 45 mols of ethylene oxide per mol of castor oil wherein the ester is composed of at least one mole of the acid per mole of the castor oil.

4. A phthalic acid ester of oxyethylated castor oil oxyethylated with 15 mols to 45 mols of ethylene oxide per mol of castor oil wherein the ester is composed of at least one mole of the acid per mole of the castor oil.

5. A polymer acid ester of a polymer acid, consisting predominantly of dicarboxy, dimerized fatty acids containing 12 to 40 carbon atoms, and oxyethylated castor oil oxyethylated with 15 mols to 45 mols of ethylene oxide per mol of castor oil wherein the ester is composed of at least one mole of the acid per mole of the castor oil.

6. A linoleic dimer acid ester of oxyethylated castor oil oxyethylated with 15 mols to 45 mols of ethylene oxide per mol of castor oil wherein the ester is composed of at least one mole of the acid per mole of the castor oil.

7. An ester of the polycarboxy acid mixture which is a residue from the dry distillation of castor oil in the presence of an alkali and oxyethylated castor oil oxyethylated with 15 mols to 45 mols of ethylene oxide per mol of castor oil wherein the ester is composed of at least one mole of the acid per mole of the castor oil.

8. An organic dicarboxy acid ester of oxyethylated castor oil oxyethylated with 15 mols to 45 mols of ethylene oxide per mol of castor oil wherein said dicarboxy acid consists essentially of a mixture of diglycolic acid and dimerized linoleic acid wherein the ester is composed of at least one mole of the acid per mole of the castor oil.

References Cited in the file of this patent
UNITED STATES PATENTS

| | | |
|---|---|---|
| 2,344,980 | De Groote et al. | Mar. 28, 1944 |
| 2,498,658 | De Groote et al. | Feb. 28, 1950 |
| 2,695,883 | Smith | Nov. 30, 1954 |